(12) United States Patent
Lau et al.

(10) Patent No.: US 10,847,056 B2
(45) Date of Patent: Nov. 24, 2020

(54) PORTABLE MULTI-INTERFACE BRAILLE KEYBOARD SYSTEM FOR HANDHELD DEVICES

(71) Applicant: Prceptiv Research Office Limited, Hongkong (HK)

(72) Inventors: Te On Peter Lau, Hongkong (HK); Fairoz Mohamed Noor, Hongkong (HK); Alexandre Jacques Henri Caussel, Hongkong (HK)

(*) Notice: Subject to any disclaimer, the term of this patent is extended or adjusted under 35 U.S.C. 154(b) by 409 days.

(21) Appl. No.: 15/880,626

(22) Filed: Jan. 26, 2018

(65) Prior Publication Data
US 2019/0236981 A1 Aug. 1, 2019

(51) Int. Cl.
*G09B 21/00* (2006.01)
*G06F 1/16* (2006.01)
*G06F 3/01* (2006.01)
*G09B 21/02* (2006.01)

(52) U.S. Cl.
CPC ......... *G09B 21/004* (2013.01); *G06F 1/1669* (2013.01); *G06F 1/1692* (2013.01); *G06F 3/016* (2013.01); *G09B 21/025* (2013.01)

(58) Field of Classification Search
CPC .. G09B 21/001; G09B 21/002; G09B 21/003; G09B 21/004; G09B 21/02; G09B 21/025
USPC .................................. 434/112, 114, 115, 117
See application file for complete search history.

(56) References Cited

U.S. PATENT DOCUMENTS

| | | | | |
|---|---|---|---|---|
| 6,549,789 B1* | 4/2003 | Kfoury | ................. | H04M 1/021 455/550.1 |
| 8,425,232 B2* | 4/2013 | Fukami | ................. | G09B 21/02 434/113 |
| 8,633,907 B2* | 1/2014 | Mahalingam | ........ | G09B 21/003 178/18.01 |
| 9,026,187 B2* | 5/2015 | Huang | ................. | H04B 1/3888 455/575.8 |
| 9,202,095 B2* | 12/2015 | Martin | ................. | G06K 7/1091 |
| 10,282,052 B2* | 5/2019 | Meredith | ............ | G06F 3/04817 |
| 2002/0054030 A1* | 5/2002 | Murphy | .............. | G06F 3/04886 345/173 |
| 2005/0164148 A1* | 7/2005 | Sinclair | ................ | G09B 21/003 434/112 |
| 2007/0254268 A1* | 11/2007 | Adachi | ................ | G09B 21/003 434/112 |
| 2008/0020356 A1* | 1/2008 | Saba | ..................... | G09B 21/003 434/113 |
| 2010/0182242 A1* | 7/2010 | Fields | ................... | G06F 3/0219 345/169 |
| 2010/0238119 A1* | 9/2010 | Dubrovsky | ......... | G06F 3/04886 345/169 |
| 2010/0328231 A1* | 12/2010 | Pasquero | .............. | G06F 1/1662 345/173 |

(Continued)

*Primary Examiner* — Kurt Fernstrom
(74) *Attorney, Agent, or Firm* — W&K IP

(57) ABSTRACT

This disclosure relates to a portable multi-interface Braille key board cell system. The system includes a bump frame and a Braille keyboard module that are assembled together. The Braille keyboard module unit includes a Braille keyboard assembly integrated together with an extendable and retractable wing panel mechanism. The system is further in integration with a controller and a processing unit of a handheld device. The system can further access functions of the handheld device via Braille buttons or presser buttons provided by the Braille keyboard assembly.

19 Claims, 10 Drawing Sheets

(56) References Cited

U.S. PATENT DOCUMENTS

2011/0020771 A1* 1/2011 Rea .................. G09B 21/02
434/114
2015/0065210 A1* 3/2015 Drori ................ H04M 1/0283
455/575.8

* cited by examiner

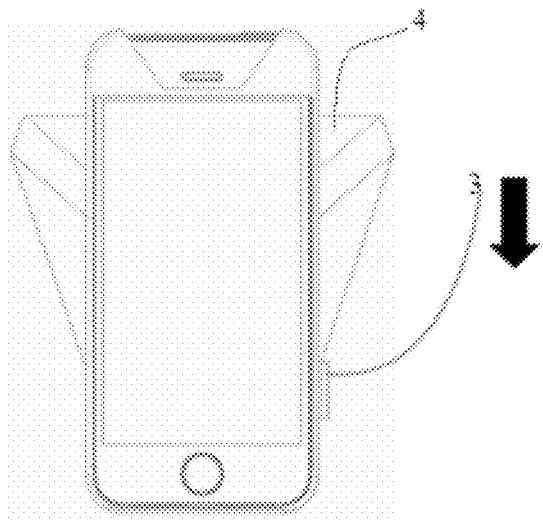
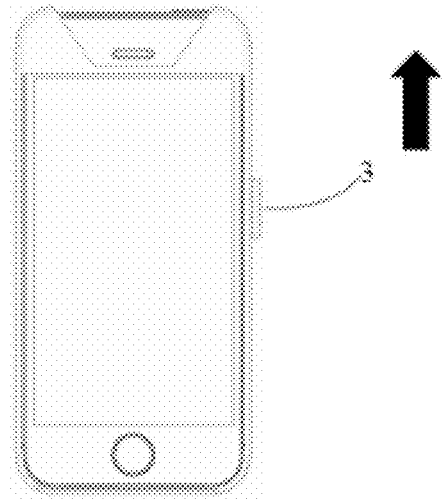
Figure 9(a)                                    Figure 9(b)
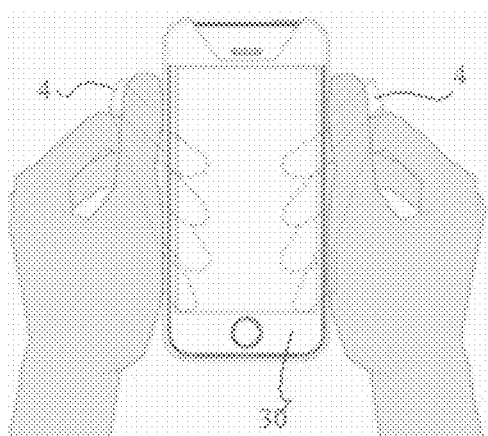
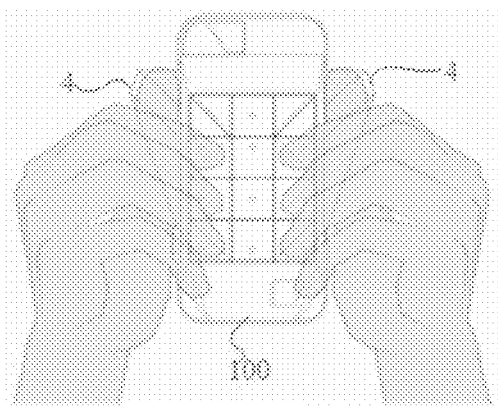
Figure 10(a)                                   Figure 10(b)

PORTABLE MULTI-INTERFACE BRAILLE KEYBOARD SYSTEM FOR HANDHELD DEVICES

FIELD OF THE INVENTION

The present invention is generally related to a portable multi-interface Braille keyboard cell system with keyboard feature setting to be attached with a handheld device for back face button pressing; wherein said Braille keyboard system primarily comprises a keyboard module unit with standard vertical Braille cell system as buttons & a main feature setting attachable on a detachable shell or bumper frame, wherein said Braille keyboard system also comprises of a pair of wing panel mechanism with its safety lock cap towards providing a pair of thumb rests. Said assembly of portable multi-interface Braille Keyboard system is provisioned for mounting on the back panel of the said detachable shell on a handheld device, preferably on the back face of a touch screen mobile phone, making it operational by using Braille cell system as buttons & its other main feature setting of said Braille keyboard. Further to this, a pair of 'thumb rest wings' is provisioned for comfortable use while operating the said portable multi-interface Braille Keyboard unit as a back face Braille as button keyboard. Various in-built Accessibility features are available to be access and could be used or adapted to be used to integrate functionality and language of the handheld device with the device of the present invention.

BACKGROUND OF THE INVENTION

Handheld devices, such as, iPad, mobile phone, remote controller portable, video game etc are now the part of our everyday life. Especially smart phones with touch screen are becoming necessity for everybody, not only for voice communication but also for performing several activities, namely text messaging, calculations, gaming, typing a document, net-banking, e-shopping, ticketing, internet based or other digital activities etc.

However, there are very limited options available to a visually disabled person towards performing such activities, as most of the available handheld devices do not have provision of touch/press buttons like Braille dot/cell as buttons.

Therefore the object of the present invention is to propose a portable multi-interface Braille Keyboard, particularly for a mobile device and more particularly for a touch screen mobile phone.

Another object is to propose a novel arrangement for mounting of said portable multi-interface Braille Keyboard, attachable in a detachable/adaptable shell or bumper frame, on the back panel of a handheld device, preferably on the back panel of a touch screen mobile phone and making it operational by using Braille as buttons of said Braille keyboard towards accessing complete functionality of said handheld device, preferably a smart mobile phone with assisted accessibility features.

Further object is to provision extendable wing panels, with its safety locking features, for a pair of thumb rests to improve keyboard Braille typing and griping experience.

Further another object is to customize the said Braille cell system as buttons, preferably 6 in number, of said Braille keyboard to perform almost all of the functions of a new functional keys e.g: Braille learning tool, assigned game control navigation, by way of main setting.

SUMMARY OF THE INVENTION

The present invention discloses a portable multi-interface Braille keyboard, attachable with a detachable yet adaptable shell or bumper frame for handheld devices, to be mounted on the shell or bumper frame panel of handheld devices. Main components of said portable multi-interface Braille keyboard system are:
(i) a keyboard comprising a Braille cell system as buttons,
(ii) a pair of mechanic retractable wing panels with a safety lock cap,
(iii) an external shell or the bumper frame for assembling and integrating with the said Braille keyboard system and for attaching the said Braille keyboard module unit on the back panel of the external shell or the bumper frame on a handheld device.

Details of different components of the proposed Braille keyboard system, their to assembly as a Braille keyboard module unit, the constructional and functional features of said Braille keyboard module unit and its utility as the back facing keyboard of a handheld device are being substantially described herein below with the help of certain schematic drawings.

BRIEF DESCRIPTION OF THE DRAWINGS

FIGS. 9(a) and 9(b) are schematic representations of a wing panel locking mechanism of a portable multi-interface Braille keyboard system assembled with a touch screen mobile phone, where FIG. 9(b) indicates the closed wing panels after upward movement of a sliding lock and FIG. 9(a) indicates the extended wing panels after downward movement of the sliding lock.

FIGS. 10(a) and 10(b) are schematic representations of wing panels as thumb-rest, back view and front view, respectively.

DETAILED DESCRIPTION

The most preferred embodiment of a portable multi-interface Braille keyboard system 100 for handheld devices, as described herein with using the schematic drawings is adaptable to a back panel of a touch screen mobile phone 30.

Figure 1:
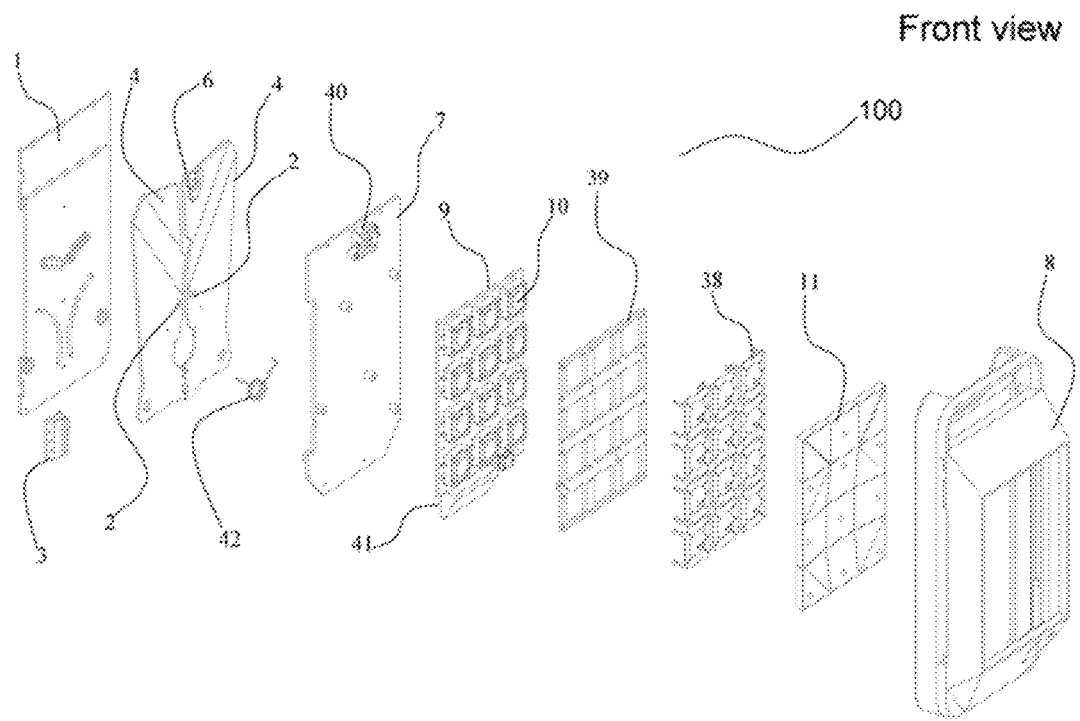
FIG. 1 is a schematic exploded front view of a portable multi-interface Braille keyboard system for a handheld device.
Figure 2:
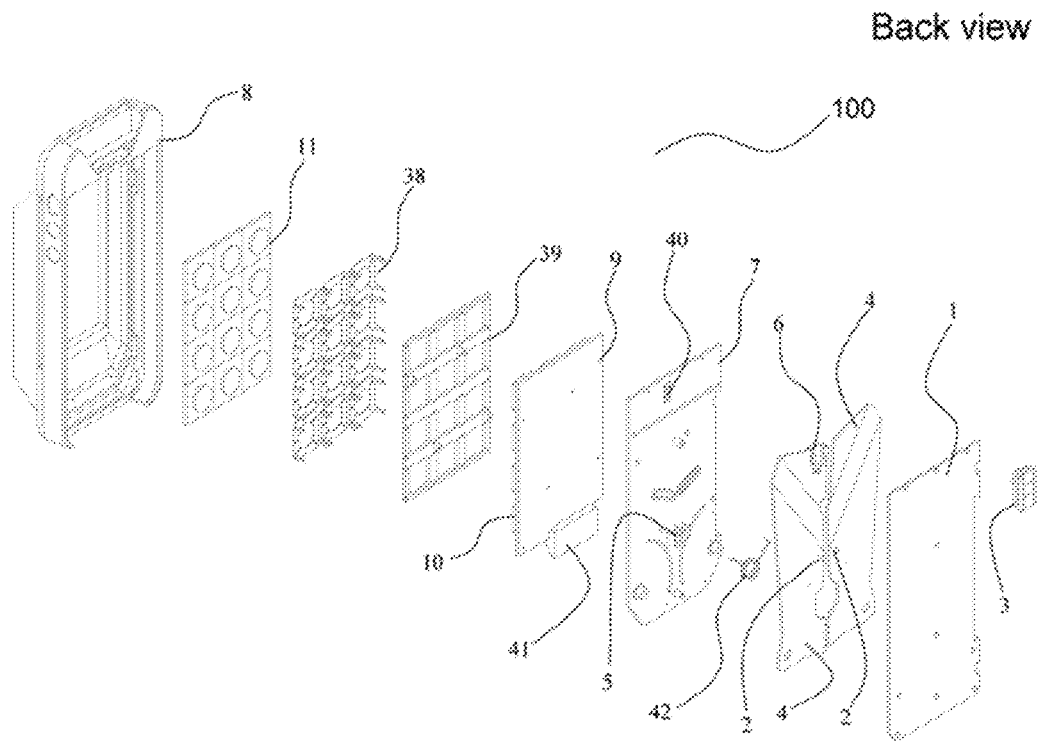
FIG. 2 is a schematic exploded back view of a portable mufti-interface Braille keyboard system for a handheld device.
Figure 8:
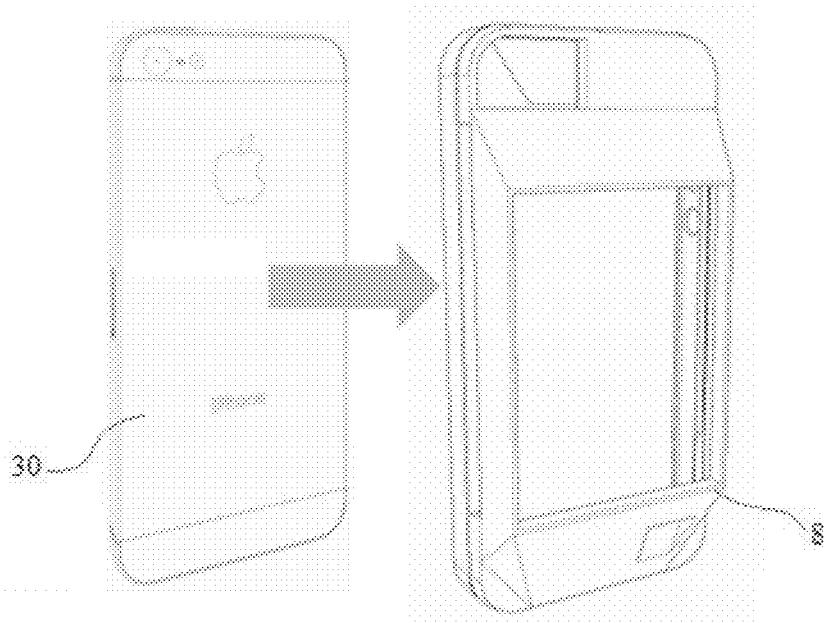
FIG. 8 schematically represents a shell or a "bumper frame" of a portable multi-interface Braille keyboard module unit, which is adaptable to a back panel of one to selected embodiment of a handheld device, preferably a touch screen mobile phone.

The exploded views of the portable multi-interface Braille keyboard system 100 is shown in FIGS. 1 and 2 which respectively indicates the basic arrangement of all important components of said keyboard system 100. Generally the keyboard system 100 is so assembled that it can execute three major functions: (i) getting attached on the back panel of the touch screen mobile phone 30; (ii) extension and closing of wing panels 4 as thumb rests; and activating-cum-using of a Braille keyboard 11 towards accessing various functionalities of the phone 30 (FIG. 8).

As per FIGS. 1 and 2 various components of said keyboard system 100 are assembled together in such a manner that they create two main segments therein: its retractable thumb rest compartment and PCB compartment. A back panel divider 1 is a back panel of the keyboard system 100. While attaching the keyboard system 100 onto the back panel of the phone 30, said back panel divider 1 comes in direct contact with the back panel of the phone 30. A wing extent restrictor 2 controls the movement of the wing panels 4. A sliding lock 3 is the lock with sliding provisions for extending and closing the thumb rest wing panels 4. The sliding lock 3 is provisioned in said keyboard system 100 for controlling the retractable thumb rest wing panels 4 (FIGS. 9 (a) & (b). A spring holder 5 is provisioned in said keyboard system 100 to hold a spring 42 that assists a push-catch retraction mechanism. It is used to control the deviation of the retractable thumb rest wing panels 4. An opening on the wing panels are the key component for the push-catch mechanism to get realized, where a movable push-cash 6 is arranged within the opening. A dividing panel 7 comprises slots on the back sheet separating the retractable thumb rest compartment from the PCB-Braille keyboard compartment.

An exterior shell or a bumper frame 8 is the frame to assemble all the components of said keyboard system 100 including its retractable thumb rest compartment and the PCB-Braille keyboard compartment. This bumper frame 8 is to also responsible to hold the side peripheral walls of the phone 30 and attach the keyboard system 100 at the back panel of the phone 30.

A printed circuit board (PCB) 9 is responsible for active functioning of PCB buttons 10 as Braille buttons, provisioned on the Braille keyboard 11. The Braille keyboard 11 position is hold by assembly of a keyboard hook plate (which has multiple keyboard hooks for assembling) 38 and a corresponding keyboard hook holder 39), and then the Braille keyboard 11 is fixed onto the dividing panel 7. The printed circuit board (PCB) 9 is powered by a rechargeable battery 41.

Figure 13A:
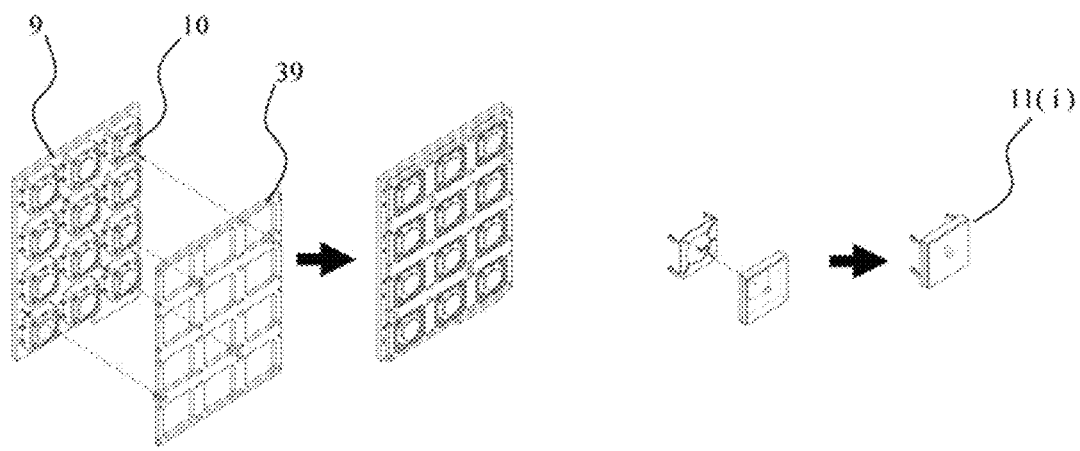
FIGS. 13(a), 13(b), 13(c) are schematic sequential diagrams for assembling a keyboard, keyboard hooks and a keyboard hook holder.
Figure 13B:
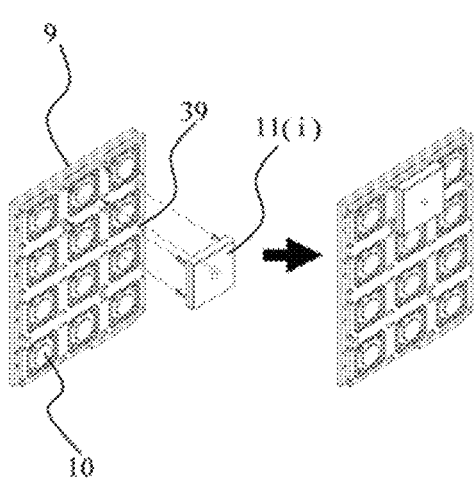
Figure 13C:
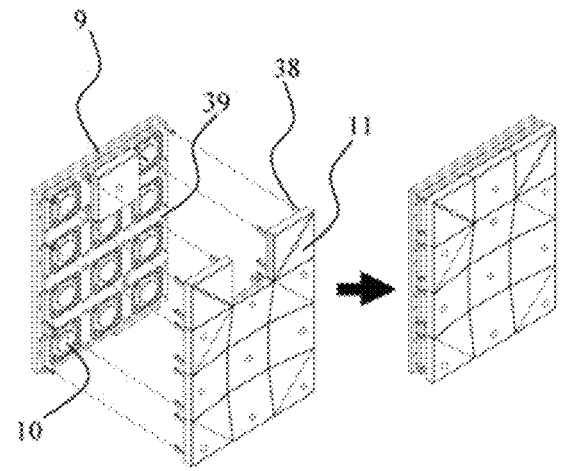
Figure 14A:
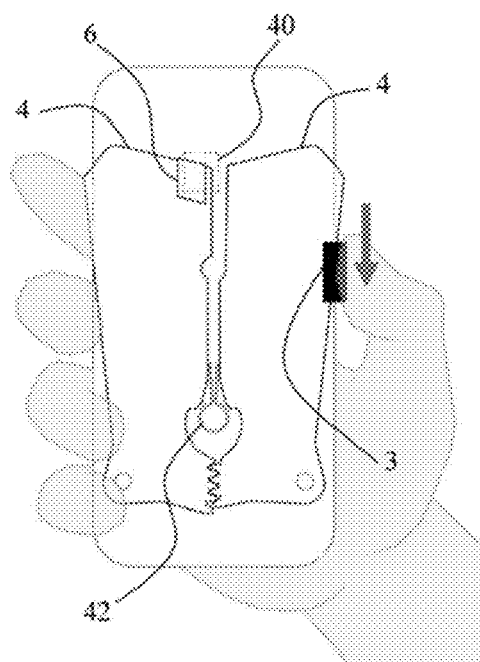
FIGS. 14(a), 14(b), 14(c), 14(d) are schematic sequential diagrams for extending (opening) a wing panel mechanism with the assistant of a push-catch mechanism.
Figure 14B:
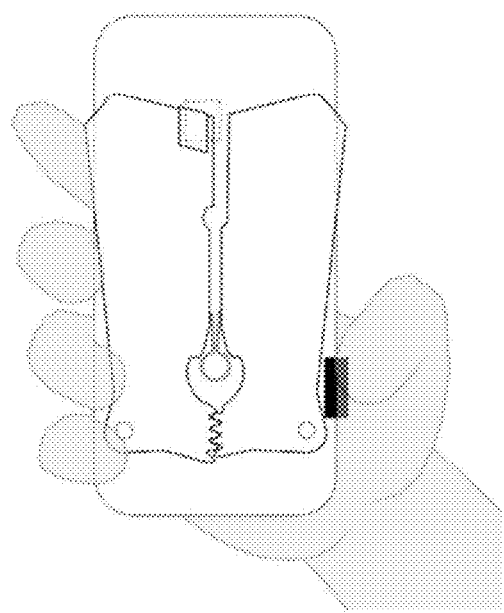
Figure 14C:
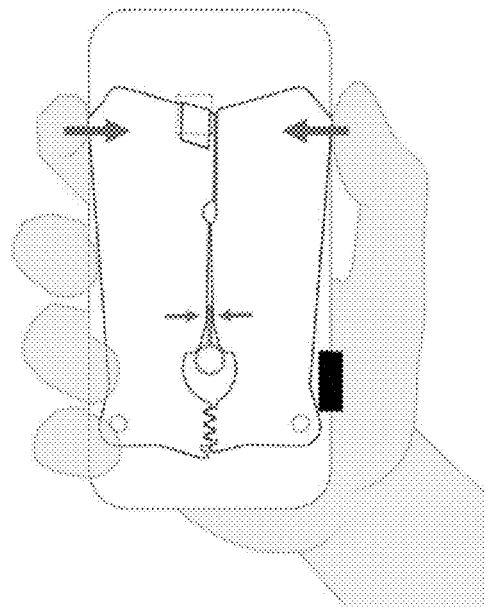
Figure 14D:
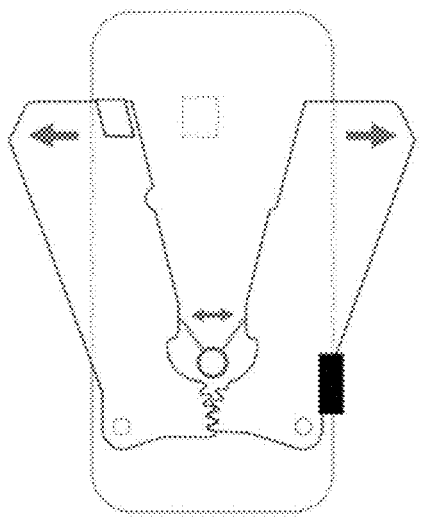
Figure 14E:
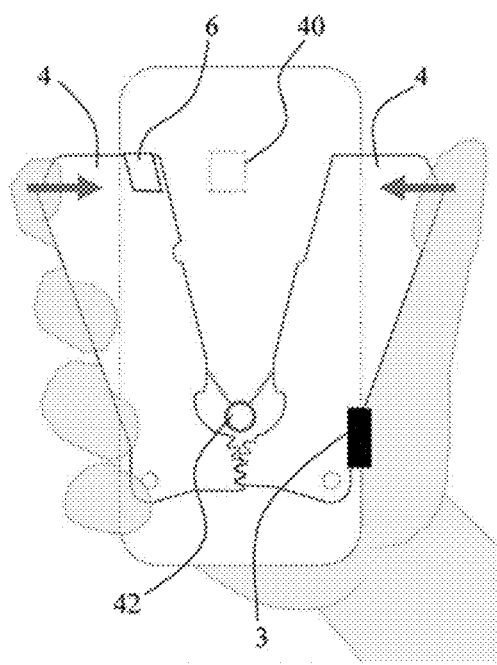
FIGS. 14(e), 14(f), 14(g), 14(h) are schematic sequential diagrams for retracting (closing) a wing panel mechanism with the assistant of a push-catch mechanism.
Figure 14F:
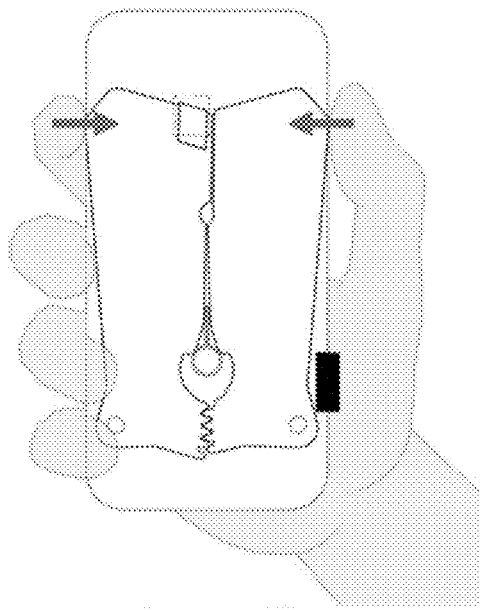
Figure 14G:
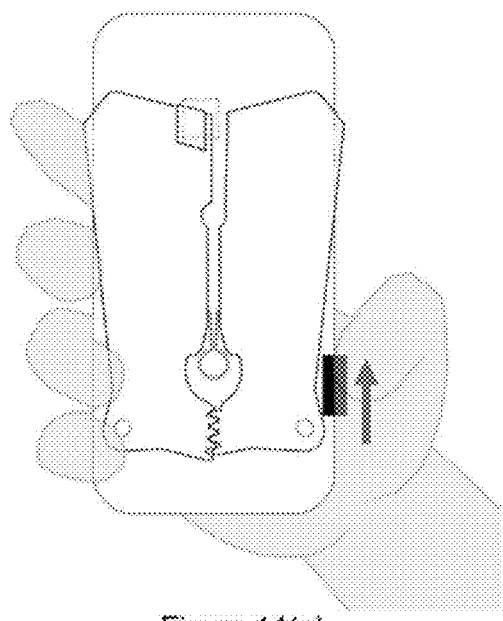
Figure 14H:
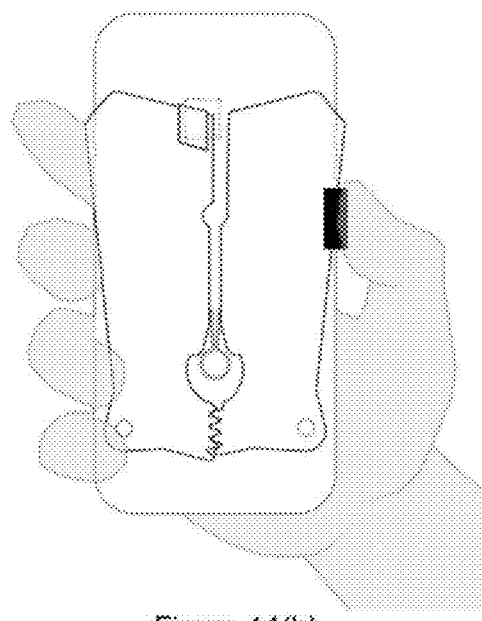

Further referring to FIGS. 13(a)-13(c), those figures schematically show an assembling process of the Braille keyboard assembly, where a butt-joint-button-keyboard is required for this Braille keyboard assembly. Due to the arrangement of the keyboard hook plate 38 and the corresponding keyboard hook holder 39, the Braille keyboard assembly can be created through button hooking and holding method. This assembling method can also prevent any disruption of the mechanic of tactile button when pressed, which disruption may affect the usage of the Braille keyboard system. First, as shown in FIG. 13(a), the keyboard hook holder 39 is fixed over the printed circuit board 9 with the PCB buttons 10. After that, the keyboard hook plate 38 assemble with a keyboard button 11i is then attached onto the keyboard hook holder 39. This attachment operation is repeated for each keyboard button 11i until all the keyboard buttons 11i are attached and the Braille keyboard assembly is completed as shown in FIG. 13(c).

The overall design of the external shell or the bumper frame 8 is one of the most important features of the portable multi-interface Braille keyboard system 100. It not only assembles and integrates the components of the retractable thumb rest compartment and the components of the PCB-Braille keyboard compartment, but also it holds and gets attached to the body of the phone 30 too, preferably as a press-fit frame to said keyboard system 100.

Figure 3A:
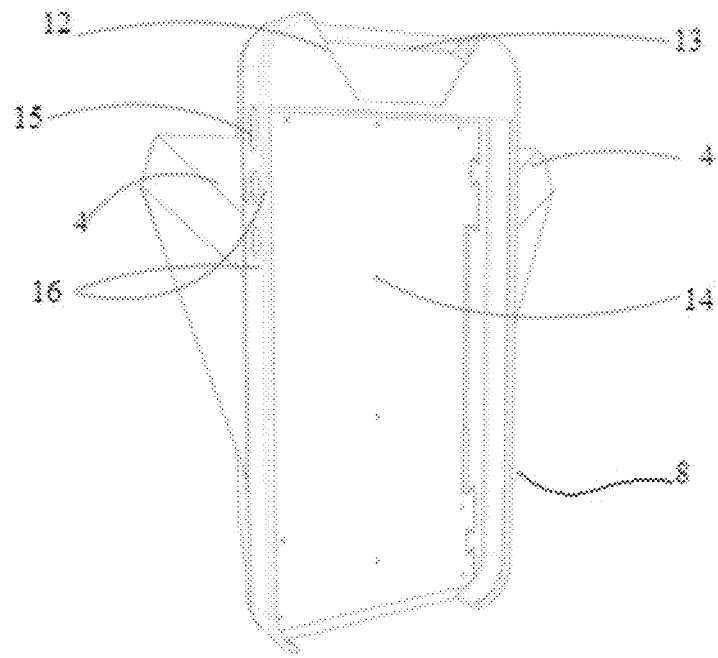
FIGS. 3(a) & 3(b) are schematic rear and front views of a portable multi-interface Braille keyboard system.
Figure 3B:
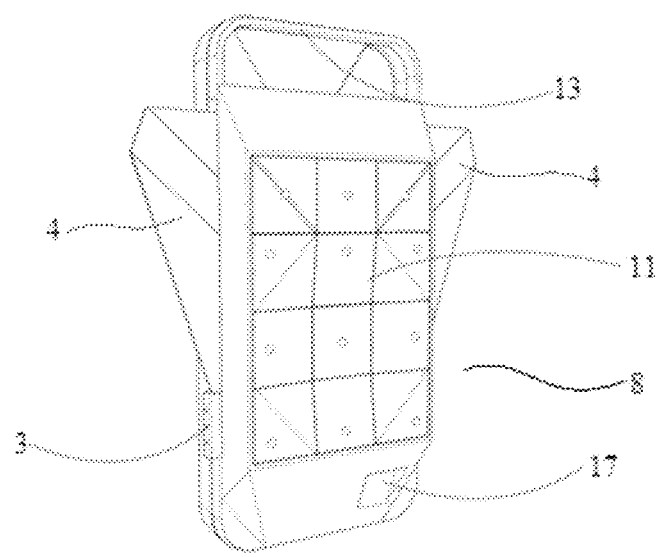

FIGS. 3(a) and 3(b) depict following structural features of one preferred embodiment of said bumper frame 8 which support the effective functioning of said bumper frame 8:

a wide angle opening 12 for ALS proximity, front camera, microphone & receiver;

a full width opening 13 for rear flash, rear microphone & rear camera;

the retractable thumb-rest wing panels 4;

a counter-sunk screw fixing location 14;

one opening 15 for ringer switch of the phone 30;

two openings 16 for volume buttons +/−;

the keyboard 11;

an opening 17 for micro USB connection (preferably for battery recharging);

the sliding lock 3 to operate the retractable thumb rest wing panels 4.

Figure 4:
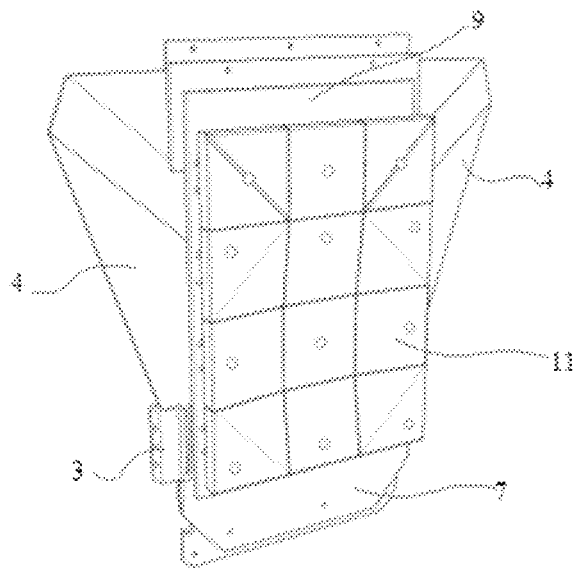
FIG. 4 is a schematic complete front view of a core Braille keyboard module unit integrated with a wing panel mechanism.

The core portable keyboard module structure (FIG. 4) of the most preferred embodiment of the portable multi-interface Braille keyboard system 100 comprises of 12 functional buttons as mirrored standard Braille buttons, in an arrangement of 3×4, that is 3 buttons in a column and 4 buttons in a row therein. Said core portable keyboard module structure is installed in the bumper frame 8 in such a way that the Braille keyboard 1) makes the front and the outer side of the installation therein.

Said core keyboard module structure is preferably an integrated system, wherein the Braille keyboard 11 and the wing panel mechanism are integrated together and wherein the keyboard segment 11 primarily functions as per the provisions made with its PCB 9 and the application based activity instructions, but said wing panel mechanism primarily acts mechanically to extend or retract the wing panels 4 using the sliding lock 3.

In one optionally preferred embodiment of the portable multi-interface Braille keyboard system 100, the sliding down of the sliding lock 3 is not only responsible for releasing (extending) the wing panels 4 but it also optionally functions as the activation of the Braille keyboard 11 and vise-versa. That is, in one preferred embodiment of said Braille keyboard system 100 the keyboard power supply activation and deactivation is controlled by extension and retraction of the thumb rest wing panels 4 respectively, preferably by sliding of the sliding lock 3. Generally an On/Off button 28 functions towards activation and deactivation of said Keyboard 11.

Figure 5:
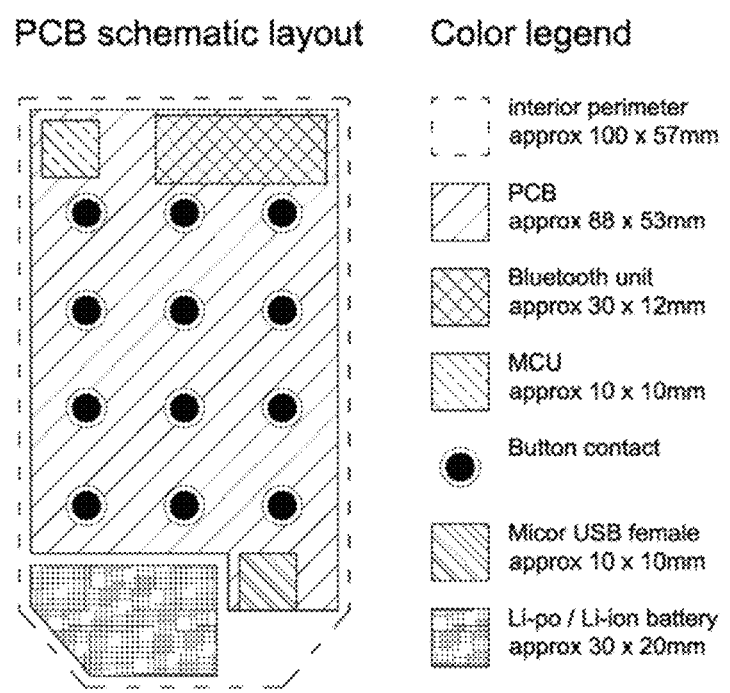
FIG. 5 is a schematic PCB layout for one preferred embodiment of a portable multi-interface Braille keyboard system.
Figure 11:
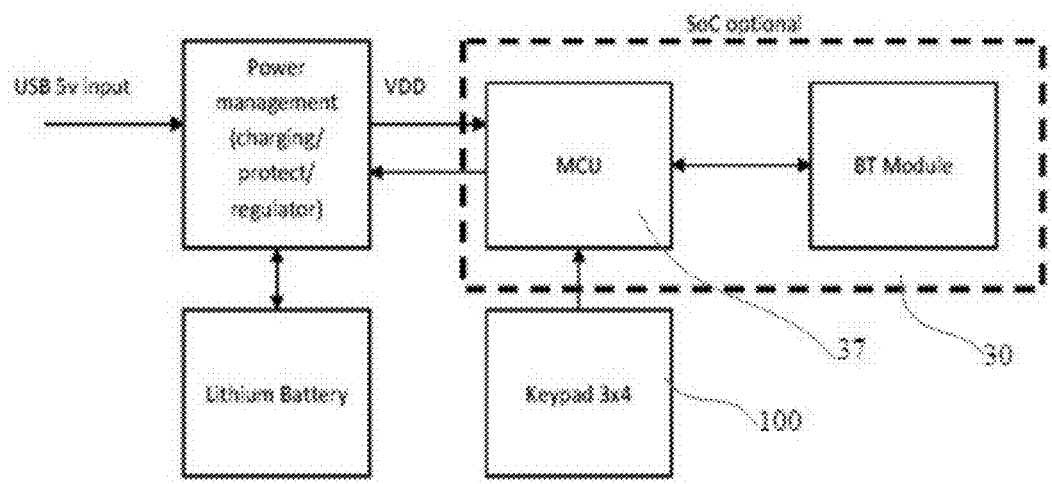
FIG. 11 is a schematic block diagram of incorporation of a portable multi-interface Braille keyboard system with a control mechanism of a handheld device towards its functioning and accessing the functionality of said handheld device.

One preferred embodiment of the schematic layout of the PCB 9 of the most preferred embodiment of the portable multi-interface Braille keyboard system 100 is depicted in FIG. 5. The PCB 9 is mainly responsible for realizing all the functions of said Braille keyboard system 100 and to access all functionalities of the handheld phone 30 attached thereto. When said keyboard system 100 is assembled onto the back panel of the phone 30, said PCB 9 of the keyboard system 100 is integrated with the controller and processing unit, MCU 37 of said phone 30, preferably through Bluetooth connection therein (FIG. 11). Said MCU 37 of the handheld phone 30 preferably functions in coordination with the Bluetooth (BT) module, the power supply unit and its power management module provisioned within the phone 30 itself. Thus the proposed keyboard system 100 has portability towards integrating with the processing and control mechanism of the handheld device, preferably a handheld phone and more preferably a touch screen mobile phone 30, enabling it to access all functionality features of said handheld device or the phone. Said keyboard system 100 preferably has mobile accessibility feature functions, including iOS VoiceOver and Android BrailleBack.

Figure 7:
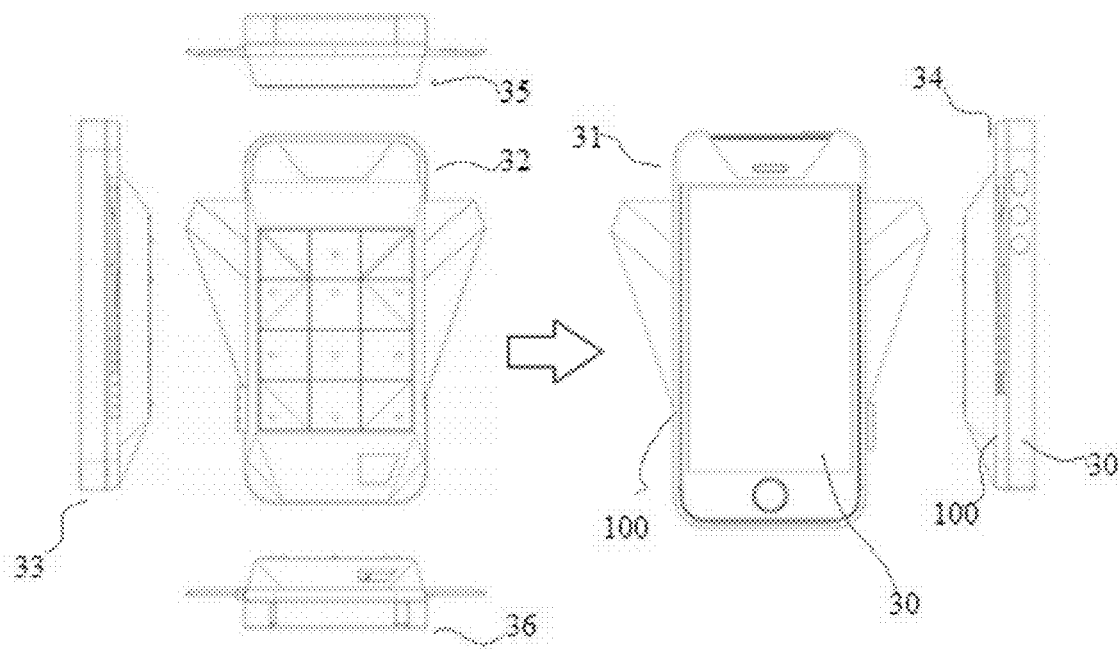
FIG. 7 represents schematic different (front, rear, left side, right side, top side and bottom side) views of a portable multi-interface Braille keyboard system, assembled onto a back panel of one preferred handheld device as a touch screen mobile phone.

FIG. 7, in various schematic views of one preferred portable multi-interface Braille keyboard system 100, indicates the structural features of said keyboard system 100 showing several openings and slots on its side wall surfaces through which the functional keys and other such functional features like USB port, camera and speaker etc. of the phone 30 can be duly operated or used. Said structural features of the keyboard system 100 are so customized with the external structure and dimension of the touch screen mobile phone 30, for which the keyboard system 100 is designed, that all the functional components of said phone 30 act effectively, without experiencing any interference or hindrance due to said keyboard system 100, mounted onto its back panel therein.

Rather said keyboard system 100, once mounted onto the handheld device, a phone 30, and made duly functional by integrating its PCB 9 with the MCU 37 of the phone 30, it becomes an integrated handheld phone device 30 with Braille keyboard, extending the accessibility of all the functions of said phone 30 to a visually disabled person. The integration of said keyboard system 100 with the controller and processing unit, MCU 37 of the phone 30 therefore extends such portability and multi-interface functionality to the said keyboard system 100 that said phone 30 gets additional features of said keyboard system 100, making it suitable for a visually disabled person to access said phone 30 through the Braille buttons. Such integration therein extends the utility of the said keyboard system 100 to perform typing, massaging, gaming, educational applications, e-banking and other such application based internet activities.

The bumper frame or the external shell 8 gets detachably accommodated on the side peripheral walls of the handheld device 30. Thus the back sheet 1 of the portable multi-interface Braille keyboard system 100 comes in direct contact with the back panel of the handheld device 30. Thus said bumper frame 8 plays the role of active tool to physical integration of the handheld device 30 and the keyboard system 100. FIG. 8 indicates the schematic plan to accommodate the phone 30 within the central cavity of said bumper frame 8, preferably by creating structural provisions on inner surface of the peripheral walls of said frame 8 for press-fitting and firmly holding the said phone 30 within the central cavity of said bumper frame 8.

FIG. 9(*b*) represents the position of the portable multi-interface Braille keyboard system 100, duly mounted on a handheld device 30, which is a touch screen phone in the schematic representation herein. In the front view, only the sliding lock 3 of said keyboard system 100 is visible and the whole body gets covered by the device 30. Sliding the sliding lock 3 upwardly retracts the wing panels 4. When the sliding lock 3 slides downwardly, as schematically shown in FIG. 9(*a*), it releases the wing panels 4 outwardly to facilitate thumb rests, while accessing the Braille keyboard 11.

The extension and retraction of the wing panels 4 are enabled by the push-catch mechanism when the sliding lock 3 is operated. As shown in FIGS. 14(*a*)-14(*h*), the push-catch mechanism includes three components: a stationary push-catch 40, a movable push-cash and a supporting V-spring 42. The stationary push-catch 40 is operable to hold and release the movable push-catch 6, and the V-spring 42 can react in tandem by pushing both the wing panels outwardly.

The mechanic of the stationary push-catch 40 works by triggering from either holding or releasing (or vice versa) in contact with the movable push-catch 6 depending on specific usage. The operation of the push-catch mechanism is guarded by the sliding lock 3.

When the two push-catch components 6 and 40 are met and held, further inward pressure can be applied on the movable push-catch 6 via both wing panels 4. The inward pressure will trigger the stationary push-catch 40 to be released, as shown in FIGS. 14(*a*), 14(*b*), 14(*c*), 14(*d*). First, the sliding block is made to slide down fully. The retracted wing panels 4 are further pushed inward to let the movable push-catch 6 to trigger the stationary push-catch 40 for releasing. Also, the pressure inward can also compress the V-spring 42. After the stationary push-catch 40 release the movable push-catch 6, decompression of the V-spring 42 will push both wing panels outwardly.

When the two push-catch components 6 and 40 are apart, inward pressure via both wing panels 4 will let the movable push-catch 6 to be back to a contracted position which will trigger the stationary push-catch 40 to be held in place, as shown on FIG. 14(*e*) 14(*f*), 14(*g*), 14(*h*). First, both extended wings 4 are pushed inwardly back to their retracted positions, so as to let the movable push-catch 6 re-meet and trigger the stationary push-catch 40 for holding. After the stationary push-catch 40 holds the movable push-catch 6, the sliding lock 3 is made to slide up fully to secure the wing panels 4.

FIGS. 10(*a*) and (*b*) depict the back and front views of the positions of thumbs of a user while using a handheld phone device 30, fitted with the portable multi-interface Braille keyboard system 100. In FIG. 10(*b*) the back side of the phone 30 is shown wherein only the front part keyboard 11 of the keyboard system 100 is visible. The wing panels 4 are visible in extended and thumb rest position and fingers of the user are easily accessing all the Braille buttons of said Braille keyboard system 100. In FIG. 10(*a*) the phone 30 is visible and the thumbs of the user are shown, duly placed on the wing panels 4 of the keyboard system 100, acting as thumb rests therein. Such provision of thumb rest improves the device holding and grip experience while typing and using the Braille keyboard, especially as the keyboard system 100 is mounted on the backside of the handheld phone 30.

Figure 6A:
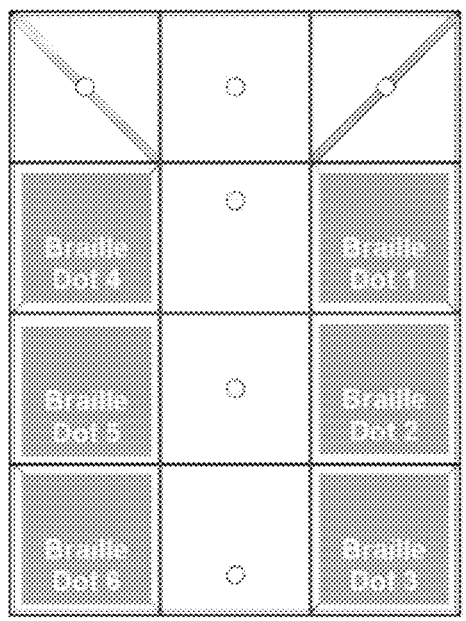
FIG. 6(a) represents a schematic view of a standard Braille cell mirror as buttons on a keyboard and FIG. 6(b) represents a schematic plan of different Braille buttons on a keyboard detailing their specific functions.
Figure 6B:
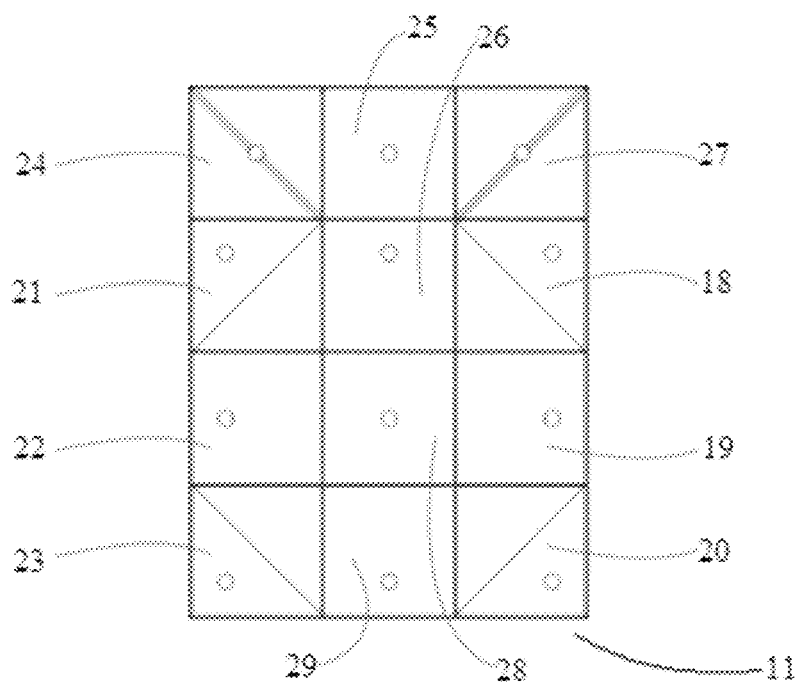

In said preferred keyboard 11 as indicated in FIGS. 6(*a*) and 6(*b*), six buttons 18, 19, 20, 21, 22 and 23, as depicted in FIGS. 6(*a*) and 6(*b*) are provisioned as Braille buttons. The key button 28 in the keyboard 11 is the On/Off key. Other key buttons are provisioned for following activities:

key button 24 is the 'Enter' key; key buttons 25 is the 'Space' key; key button 26 is the 'Read' key; key button 27 is the 'Backspace' key (for Android)/'Delete' (for iOS) and key button 29 is the 'Application dependent key' to activate and deactivate any application based activity, other than simple typing using Braille buttons.

Braille and its details are preset within the PCB 9 of the keyboard system 100. The PCB buttons 10 act as to access these Braille and their detailed functions. These PCB button 10 are standard cell mirrored as Braille buttons on the keyboard 11.

Figures 12A, 12B:
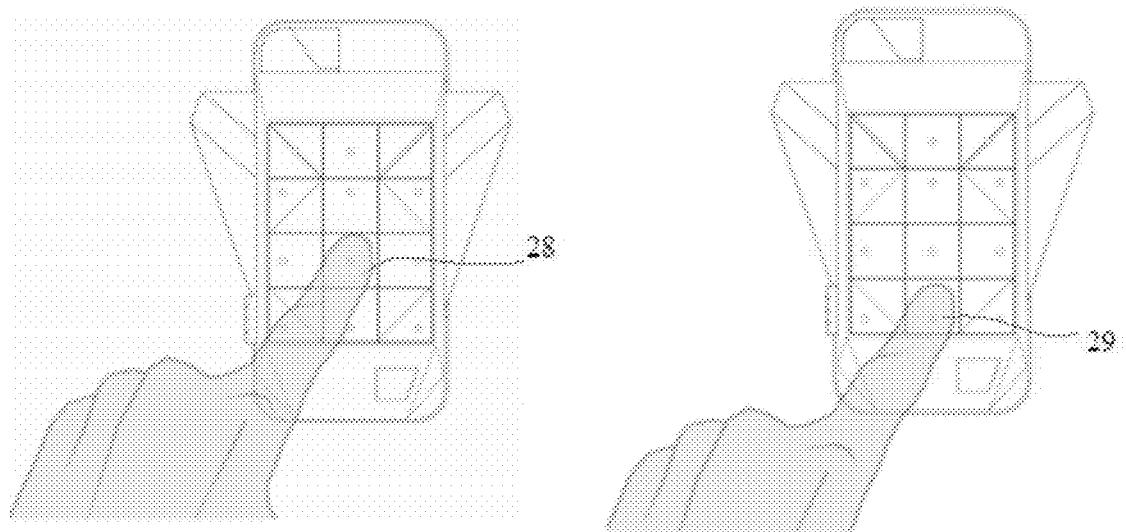
FIGS. 12 (a) and 12(b) are schematic representations of switching on/off function of a Braille keyboard (FIG. 12(a)) and application dependent activation key thereof (FIG. 12(b)).

Regarding one preferred embodiment of the keyboard system 100, FIGS. 12 (*a*) and 12(*b*) indicate schematic plans for mode of activation of the keyboard system 100 and activating its application dependent activities. By pressing and holding the switching On/Off button 28 for 3 seconds, the Braille keyboard 11 gets activated and also deactivated in the same manner. Further, by pressing and holding the application dependent button 29 for three seconds, such application based activities, for example games, are activated and deactivated. When the application dependent activities are functional, the functions of Braille buttons get completely changes, depending upon the compatible preset provisions for particular activity. Various software applications are available and could be used or adapted to be used to integrate functionality and language of the handheld device with the device of the present invention. Further, by pressing the Read Button 26 once, the system 100 will read out each formed word on screen; and by pressing the Read button 26 twice, the system 100 will read out all formed words or sentences on screen including punctuations.

Although the invention has been described with reference to specific embodiments, this description is not meant to be construed in a limiting sense. Various modifications of the disclosed embodiments, as well as alternate embodiments of the invention, will become apparent to persons skilled in the art upon reference to the description of the invention. It is therefore contemplated that such modifications can be made without departing from the spirit or scope of the present invention as defined.

We claim:

1. A multi-interface Braille keyboard modular system (100) to be removed & attached on a back panel of a handheld device, comprising:
   a bumper frame (8) and a Braille keyboard module unit that are assembled together; wherein the Braille keyboard module unit comprises a Braille keyboard assembly integrated together with an extendable and retractable wing panel mechanism;
   wherein said multi-interface Braille keyboard modular system is characterized in its integration with a controller and a processing unit of the handheld device through wireless communication & connection technology, and in accessing functions of said handheld device (30) via Braille buttons and/or preset setting buttons provided by the Braille keyboard assembly.

2. The multi-interface Braille keyboard modular system, as claimed in claim 1, wherein the Braille keyboard assembly of the Braille keyboard module unit comprises of a printed circuit board (PCB) (9) with PCB buttons (10) thereon as Braille mirror buttons; wherein said Braille keyboard module unit is detachably assembled within the bumper frame (8).

3. The multi-interface Braille keyboard modular system, as claimed in claim 2, wherein the Braille keyboard assembly also comprises a Braille keyboard (11), a keyboard hook plate comprising one or more hooks and a keyboard hook holder (39), wherein the keyboard hook plate (38) and the keyboard hook holder (39) are arranged between the printed circuit board (9) and the Braille keyboard (11); the Braille keyboard assembly is positioned within the bumper frame (8) through assembling the one or more hooks and the keyboard hook holder (39) together.

4. The multi-interface Braille keyboard modular system, as claimed in claim 3, wherein the Braille keyboard (11) comprises multiple keyboard buttons (11*i*); the keyboard hook holder (39) and the printed circuit board (9) are assembled together, the multiple keyboard buttons (11*i*) are assembled with the keyboard hook plate (38), and the keyboard hook plate (38) assembled with the keyboard buttons (11*i*) is attached onto the keyboard hook holder (39) that is assembled with the printed circuit board (9).

5. The multi-interface Braille keyboard modular system, as claimed in claim 1, wherein the wing panel mechanism comprises a pair of extendable and retractable wing panels (4) that are engaged with a sliding locking cap (3), wherein such extendable and retractable wing panels are positioned below a PCB-Braille keyboard compartment within said bumper frame (8) of the said Braille keyboard modular system; and wherein said wing panel mechanism is characterized in extension and retraction of the wing panels by a downward or an upward sliding action of said sliding locking cap (3) respectively.

6. The multi-interface Braille keyboard modular system, as claimed in claim 5, wherein a keyboard power supply activation and deactivation are controlled by the extension and the retraction of the wing panels (4) respectively, and the extension and the retraction of the wing panels are achieved by sliding of the sliding locking cap.

7. The multi-interface Braille keyboard modular system, as claimed in claim 5, wherein further comprising a push-catch mechanism for extending and retracting the wing panels; the push-catch mechanism comprises a stationary push-catch (40), a movable push-catch (6) and a V-spring (42) that is arranged between the wing panels (4); when the wing panels are in an extension position, the movable push-catch (6) is released by the stationary push-catch and the V-spring (42) pushes the wing panels outwardly; when the wing panels are in a retracted position, the movable push-catch (6) is held by the stationary push-catch (40), and the V-spring (42) is compressed between the wing panels (4).

8. The multi-interface Braille keyboard modular system, as claimed in claim 1, wherein the bumper frame (8) detachably installs and holds the Braille keyboard module unit with the integrated wing panel mechanism inside its frame; and wherein said bumper frame is provisioned to assemble said Braille keyboard modular system at the back panel of the handheld device (30), by press-fitting thereon.

9. The multi-interface Braille keyboard modular system, as claimed in claim 1, wherein the plurality of the buttons in the Braille keyboard assembly are arranged vertically.

10. The multi-interface Braille keyboard modular system, as claimed in claim 9, wherein the Braille keyboard assembly comprises of twelve Braille buttons, in three columns by four rows arrangement, for back panel key button pressing; and wherein the Braille keyboard assembly comprises of six preset buttons mirroring 6-dots Braille cell system.

11. The multi-interface Braille keyboard modular system, as claimed in claim 9, wherein the Braille keyboard assembly comprises of one button functioning as a Backspace button for Android or a Delete button for iOS, one Space button, one Read button, one Enter button, one On/Off button and one application-dependent switch activation button.

12. The multi-interface Braille keyboard modular system, as claimed in claim 11, wherein on activation of an application-dependent activity, functions of said six Braille buttons get reset dependent upon preset application provisions compatible with the activity.

13. The multi-interface Braille keyboard modular system, as claimed in claim 1, wherein the handheld device is a mobile phone.

14. The multi-interface Braille keyboard modular system, as claimed in claim 1, wherein the system is portable to be removable from the handheld device, and the system is interchangeable between the respective handheld devices.

15. An inputting method with a Braille keyboard assembly as claimed in claim 1, the Braille keyboard assembly comprises buttons arranged in adjacent columns and rows, wherein said method comprises:
    providing six preset buttons mirroring 6-dot Braille;
    associating the other buttons with activities of hanheld device, for one button functioning as a Backspace button for Android or as a Delete button for iOS (27), one Space buttons (25), one Read button (26), one Enter button (24), one On/Off button (28) and one application-dependent activation switch button (29);
    activating the activities of the handheld device when the button(s) is/are pressed.

16. The inputting method as claimed in claim 15, wherein comprising:
    when the application-dependent activation switch button (29) is activated for a selected activity, regulating functions of the six preset buttons mirroring 6-dot Braille according to preset correspondence of the selected activity.

17. The inputting method as claimed in claim 15, wherein comprising:
    reading out each formed word on a screen through pressing the Read button (26) once; and/or
    reading out all formed words or sentences on the screen including punctuations through pressing the Read button (26) twice.

18. The inputting method as claimed in claim 15, wherein providing six preset buttons mirroring 6-dot Braille comprises:
    configuring said six preset buttons in two rows to get vertically arranged Braille buttons.

19. A multi-interface Braille keyboard system (100) that is detachable onto a handheld device, comprising an external shell (8) for connecting with the handheld device (30); the external shell defines a retractable thumb rest compartment and a Braille keyboard compartment;
    a Braille keyboard with multiple buttons on its surface is disposed within the Braille keyboard compartment, wherein the multiple buttons comprise Braille buttons for Braille typing; a printed circuit board (9) is also disposed within the Braille keyboard compartment, the printed circuit board (9) detects operations on the Braille buttons on the Braille keyboard (11), and communicates wirelessly with a processing unit of the handheld device to associate the operations on the Braille keyboard with processing capabilities of the handheld device;
    a wing panel mechanism is disposed within the retractable thumb rest compartment, wherein the wing panel mechanism comprises a pair of extendable and retractable wing panels (4) that is capable of extending out of and retracting back into the external shell;
    the system also comprises an on/off mechanism for controlling both extension and retraction of the wing panels, and activation and deactivation of the Braille typing via the Braille keyboard.

* * * * *